(12) United States Patent
Heinkele et al.

(10) Patent No.: US 8,275,535 B2
(45) Date of Patent: Sep. 25, 2012

(54) METHOD FOR OPERATING AN INTERNAL COMBUSTION ENGINE

(75) Inventors: Matthias Heinkele, Weil der Stadt (DE); Lutz Reuschenbach, Stuttgart (DE); Michael Drung, Muehlacker (DE); Soenke Mannal, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 604 days.

(21) Appl. No.: 12/507,603

(22) Filed: Jul. 22, 2009

(65) Prior Publication Data
US 2010/0023243 A1    Jan. 28, 2010

(30) Foreign Application Priority Data
Jul. 23, 2008   (DE) .................. 10 2008 040 633

(51) Int. Cl.
*B60T 7/12*   (2006.01)
(52) U.S. Cl. ............................ 701/103; 123/403
(58) Field of Classification Search ............... 701/101, 701/114, 115; 123/184.21, 184.56
See application file for complete search history.

(56) References Cited

U.S. PATENT DOCUMENTS

| | | | | |
|---|---|---|---|---|
| 4,166,437 A * | 9/1979 | Bianchi et al. | ........... | 123/406.44 |
| 5,889,205 A * | 3/1999 | Treinies et al. | ........... | 73/114.32 |
| 5,974,870 A * | 11/1999 | Treinies et al. | ........... | 73/114.33 |
| 7,487,031 B2 * | 2/2009 | Yasui et al. | ........... | 701/103 |
| 7,568,454 B2 * | 8/2009 | Yasui et al. | ........... | 123/90.15 |
| 2010/0152992 A1 * | 6/2010 | Burkhardt et al. | ........... | 701/102 |

* cited by examiner

*Primary Examiner* — John Kwon
(74) *Attorney, Agent, or Firm* — Kenyon & Kenyon LLP

(57) ABSTRACT

A method for operating an internal combustion engine, in which at least one first influence variable influences a state variable of the air in the intake manifold. The state variable of the air in the intake manifold is ascertained while taking into account a plurality of influence variables, which influence the state variable, while using a first physical relationship. The same state variable is ascertained while taking into account a plurality of influence variables, which influence the state variable of the air in the intake manifold while using a second physical relationship. A specific adjusting parameter, which represents a specific error in the influence variable, is linked to each influence variable. The adjusting parameters are learned and monitored in the operation of the internal combustion engine. A certain adjusting parameter is learned and monitored in an operating range of the internal combustion engine in which the other adjusting parameters have a lesser influence on the state variable than that certain adjusting parameter, and in this context, the certain adjusting parameter is adjusted in such a way that the state variable ascertained by using the first physical relationship is at least approximately equal to the state variable ascertained by using the second physical relationship.

14 Claims, 3 Drawing Sheets

METHOD FOR OPERATING AN INTERNAL COMBUSTION ENGINE

CROSS REFERENCE

The present application claims benefit under 35 U.S.C. §119 of German Patent Application No. DE 102008040633.3, filed on Jul. 23, 2008, which is expressly incorporated herein by reference in its entirety.

FIELD OF THE INVENTION

The present invention relates to a method, computer program, electrical storage medium, control and a control device for operating an internal combustion engine.

BACKGROUND INFORMATION

Conventional internal combustion engines are available in which charging of the combustion chambers with fresh air is set by at least one throttle valve. To do this, it is important to know the actual charge of the combustion chambers with air. In conventional internal combustion engines, a hot-film air mass meter (HFM) is inserted into an intake manifold upstream of the throttle valve for this purpose, by which the air mass flow through the intake manifold is able to be recorded. One trend in modern internal combustion engines, however, tends to systems which use pressure sensors instead of HFM sensors to ascertain the air charge in the combustion chambers. Among these are intake manifold sensors, boost pressure sensors and environmental pressure sensors. In such internal combustion engines it is therefore important to be able to check the plausibility, or rather the reliability of the pressure data received. The necessity of being able to identify and diagnose erroneous components, as well as possible, also comes about with a view to ever tighter exhaust gas regulations and the requirements derived from this for an on-board diagnosis.

SUMMARY

An object of the present invention is to identify and diagnose devices not working according to their function, such as intake manifold sensors, environmental pressure sensors, boost pressure sensors, throttle valve sensors, etc. Example features according to the present invention are described and are shown in the figures. The features may be important to the present invention either by themselves or in different combinations, without this being specifically pointed out.

One advantage of an example method according to the present invention is that it may make possible the use of pressure-based systems even when there are high legal requirements with regard to exhaust gas quality, and requirements, derived from this, for an on-board diagnosis. The basis for this is, that for some state variables of the air in the intake manifold, there are two or more physical description possibilities which should basically give the same result. According to the present invention, certain influence variables, which influence a state variable of the air in the intake manifold, enter both into the one and the other physical description possibility for the state variable, and that, in addition, the sensitivity of the description possibilities to the influence variables named are dependent on the operating point. With that, an adjustment of these influence variables may be made by adjusting adjusting parameters linked to the influence variable in such a way that the physical relationships used give the same value for the state variable. Based on the operating point-dependent sensitivity, in this context, a specific operating point of the internal combustion engine is assigned to each influence variable, or rather to the adjusting parameter assigned to it, in which this influence variable, or rather this adjusting parameter, in comparison to the other influence variables, or rather the other adjusting parameters, has a predominant influence on the result. If the influence variable or the corresponding adjusting parameter changes during the course of the operation of the internal combustion engine, one may conclude from this that there has been an error in the corresponding component. Therefore, using the example method according to the present invention not only permits a general diagnosis, but also a targeted "pin-pointing".

A mass flow that flows past the throttle valve may be a particularly good state variable for the application of the example method according to the present invention. Among the influence variables that are particularly suitable in this case, because they are significant, are the pressure prevailing upstream of a throttle valve ("pressure before throttle valve") which is able to be ascertained, for example, using an environmental pressure recorded by a pressure sensor with the aid of a model, a mass flow ascertained from a throttle valve angle, for instance, using a characteristics curve, and an intake manifold pressure recorded by a pressure sensor. Thus, an error in these influence variables or in the corresponding sensors, for example, of an intake manifold sensor or an environmental pressure sensors may be diagnosed specifically using the example method according to the present invention.

The mass flow past the throttle valve may also be particularly suitable as a state variable for the present method since simple physical relationships are known for the calculation of this state variable. A physical relationship is based on a "container model" for the intake manifold, and another physical relationship is based on a "throttle equation." In the case of the container model, among other things, the intake manifold pressure gradient with respect to time, the intake manifold pressure recorded by the pressure sensor and the pressure of an internal residual gas are taken into consideration. In the last of these, temperature and pulsations may also be taken into account, and one then speaks of a "degree of delivery." This is ascertained with the aid of a numerical model. In the throttle equation, a normal mass flow is used, that is ascertained via the throttle valve angle and submitted to a pressure correction and a temperature correction, and the pressure drop and the throttle effect connected with it past the throttle valve is taken into account in the form of a so-called "discharge characteristics curve." This is based on the discharge equation according to Saint-Varnant and Wantzell. The use of these two physical relationships permits the diagnosis of three components: An offset error of the pressure sensor used may be diagnosed via an adjusting parameter "intake manifold pressure." Via an adjusting parameter "normal mass flow," a leak or a contamination in the area of the throttle valve may be diagnosed, and via an adjusting parameter "pressure before throttle valve," an error of the environmental pressure sensors may be diagnosed, since the pressure used in the case of the discharge characteristics curve is usually modeled from the environmental pressure before, that is, upstream of the throttle valve, as was mentioned above.

Adjusting parameter "intake manifold pressure—offset" has a predominant influence in an upper rotational speed range, at a comparatively low intake manifold pressure. By contrast, the influence of adjusting parameter "normal mass flow—offset" predominates overall in a comparatively low rotational speed range. The adjusting parameter "pressure before throttle valve—offset" has the greatest influence on the state variable, at a comparatively high intake manifold pressure and a rotational speed that is not quite low. It is therefore proposed according to an embodiment of the present invention that rotational speed and intake manifold pressure be monitored by appropriate boundary values, and that the appropriate adjusting parameter is always learned or monitored when the internal combustion engine is working in an operating range specified by the boundary values. It is understood, in this context, that the boundary values may absolutely also be variable. For instance, the operating range in which the adjusting parameter "pressure before throttle valve" is learned and monitored, is ultimately limited by a curve that links intake manifold pressure and rotational speed, at constant throttle valve angle, to each other. The like is true also for the operating range in which the adjusting parameter "normal mass flow" is learned and monitored.

Unreliable results of the example method according to the present invention are avoided if, at least in the ascertainment or monitoring of the adjusting parameters "normal mass flow" and "pressure before throttle valve", one disregards learning or monitoring if the intake manifold pressure is higher than a boundary value, or if the ratio of intake manifold pressure and the pressure upstream of the throttle valve is greater than a boundary value.

The reliability of the example method according to the present invention is the higher, the more often the individual adjusting parameters are learned or monitored. Since even in the specific learning or monitoring operating ranges the adjusting parameters influence mutually, it is further meaningful to adjust the adjusting parameters alternatingly, to obtain a good method result. The number of adjustments carried out, as well as the trend of the changes in the adjusting parameters observed over the majority of the adjustments, may be used as a quality feature for an adjusting parameter. Such an adjusting parameter may have assigned to it a reliability coefficient, and the adjusting parameter may be released for application only when the reliability coefficient reaches a certain boundary value at least.

One simple possibility for detecting an error and, for instance, for prompting a corresponding entry in an error memory, is to compare either an absolute value of an adjusting parameter or a difference between a value ascertained during learning and a value ascertained during monitoring of an adjusting parameter to a boundary value.

BRIEF DESCRIPTION OF THE DRAWINGS

A specific embodiment of the present invention is explained in exemplary fashion below, with reference to the figures.

DETAILED DESCRIPTION OF EXAMPLE EMBODIMENTS

Figure 1:
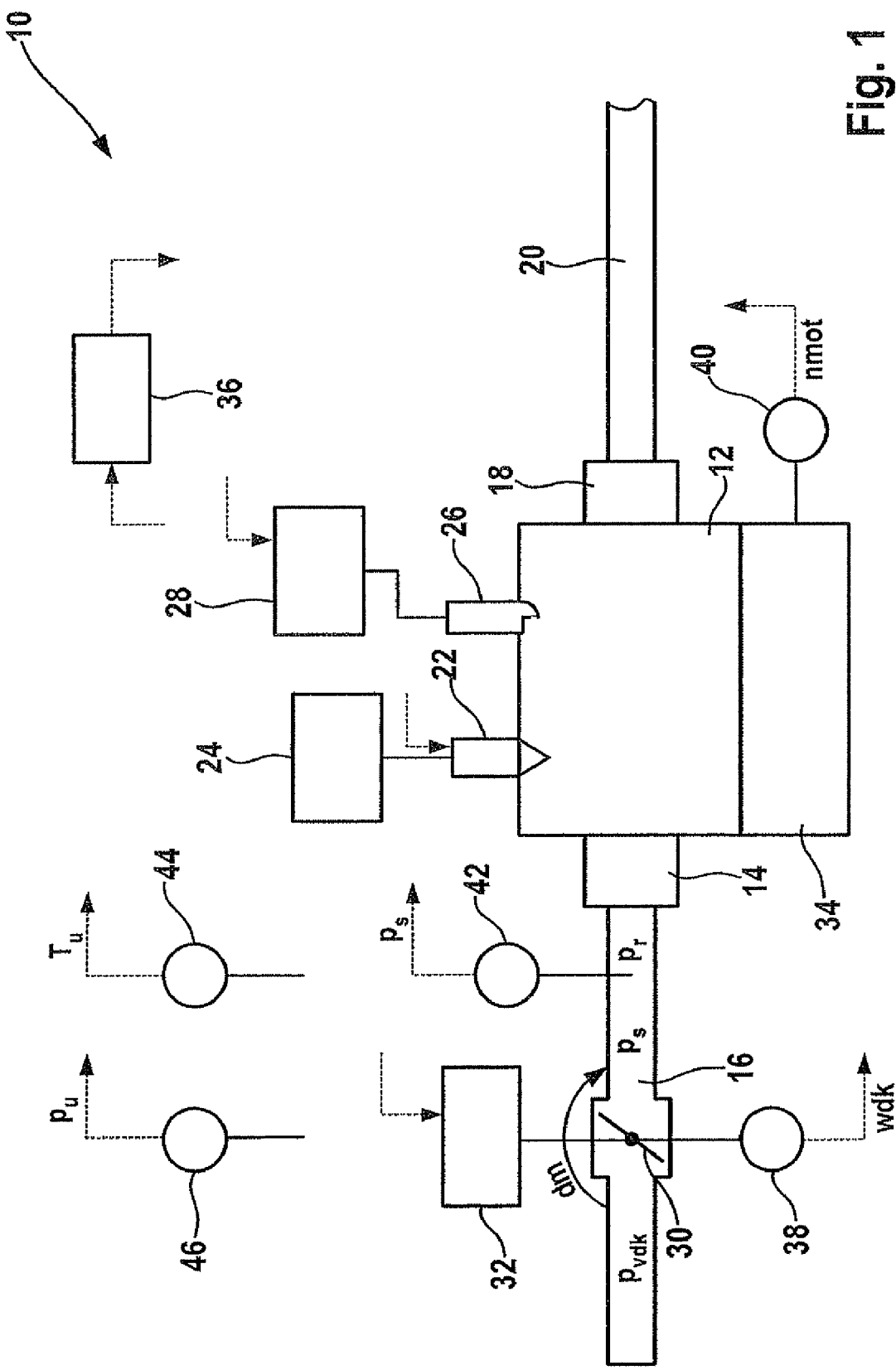
FIG. 1 shows a schematic representation of an internal combustion engine.

In FIG. 1, an internal combustion engine in its entirety bears reference numeral 10. It includes a plurality of cylinders, of which only one is shown in FIG. 1, having a combustion chamber 12. Combustion air reaches combustion chamber 12 via an intake valve 14 and an intake manifold 16. Hot combustion gases are dissipated from combustion chamber 12 via an exhaust valve 18 and an exhaust pipe 20. Fuel is injected into combustion chamber 12 directly by an injector 22 which is connected to a fuel supply system 24. A spark plug 26 ignites a fuel/air mixture that is present in combustion chamber 12. It is connected to an ignition system 28. The method described below is, however, also applicable to diesel internal combustion engines.

The quantity of air reaching combustion chamber 12 is adjusted by a throttle valve 30 in intake manifold 16. In order to do this, throttle valve 30 has an electrical final control element 32. During operation of internal combustion engine 10, a crankshaft 34 is put into rotation.

The operation of internal combustion engine 10 is controlled and regulated by a control and/or regulating device 36. Control and/or regulating device 36 activates injector 22 and ignition system 28, for example. Furthermore, control and/or regulating device 36 also activates final control element 32 of throttle valve 30. Control and/or regulating device 36 receives signals from various sensors for the control and regulation. Thus, an actual angular setting wdk of throttle valve 30 is recorded by an angular-position sensor 38. The speed nmot of crankshaft 34 is recorded by a speed sensor 40. An intake manifold pressure $p_s$ prevailing in intake manifold 16 in the area between throttle valve 30 and intake valve 14 is recorded by a pressure sensor 42. An environmental temperature $T_u$ and an environmental pressure $p_u$ are recorded by a temperature sensor 44 and an environmental pressure sensor 46.

The correct functioning of throttle valve 30, pressure sensor 42 and environmental pressure sensor 46 is diagnosed by control and regulating device 36 according to a method which is stored as a computer program in a memory of control and regulating device 36. The example method will now be explained in greater detail with reference to FIGS. 2 and 3.

Figure 2:
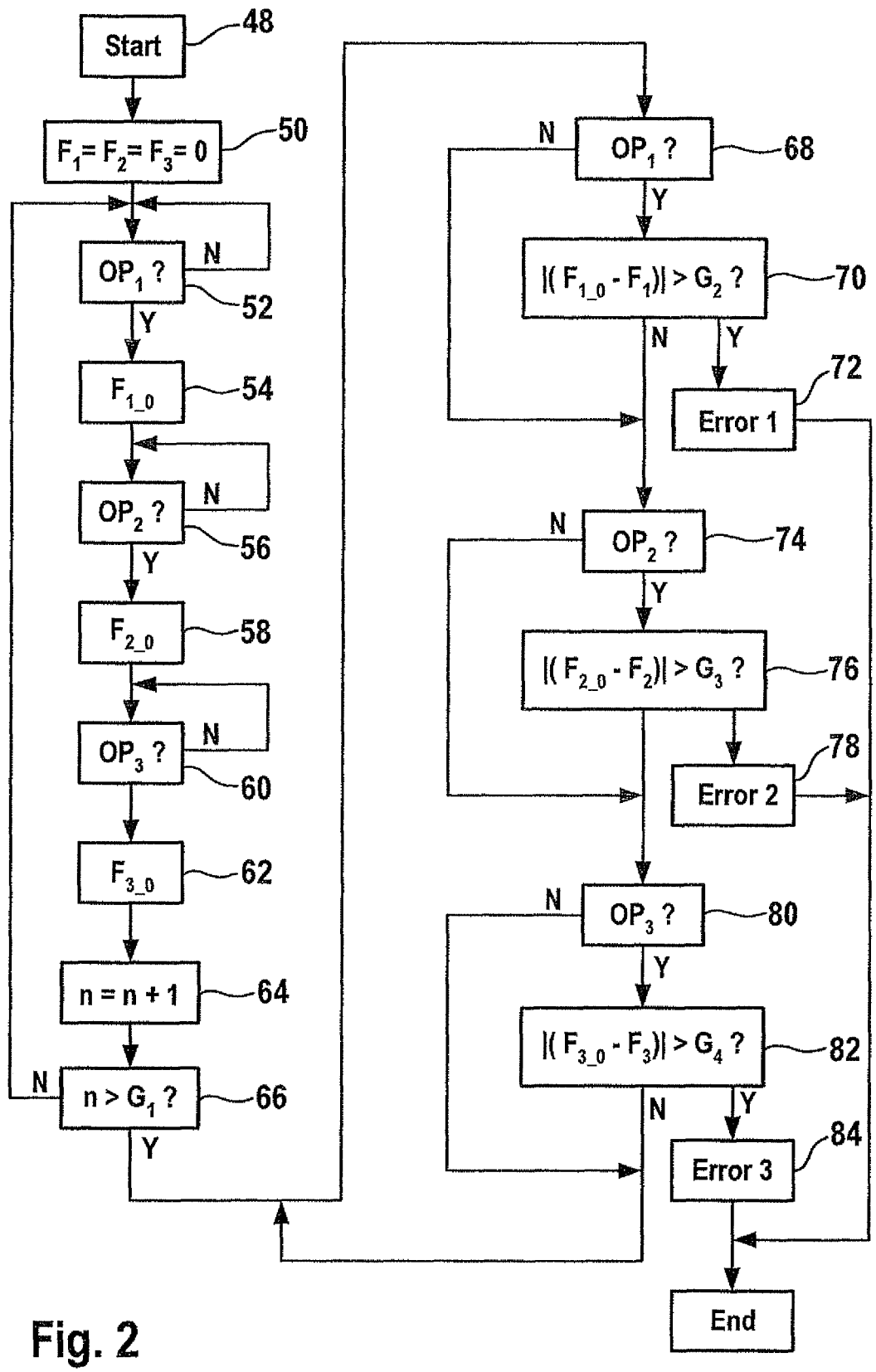
FIG. 2 shows a flow chart of a method for operating the internal combustion engine from FIG. 1.
Figure 3:
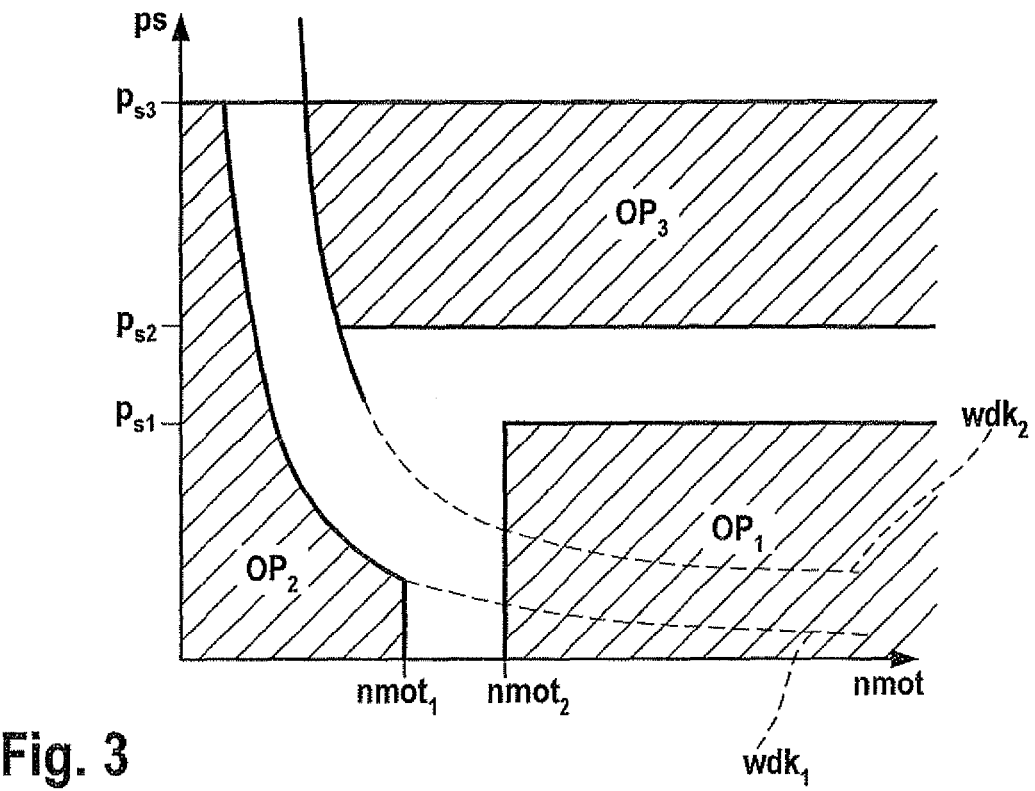
FIG. 3 shows a diagram in which various operating ranges of the internal combustion engine are shown.

The basis for the example method shown in FIGS. 2 and 3 is the calculation of a mass flow dm, which sets in across throttle valve 30. The mass flow may be shown by using two different physical relationships: The first physical relationship is based on a "container model" for intake manifold 16, and is expressed by the following formula:

$$dm_1 = dm_{dps/dt} + K_1 * K_2 * (p_s + F_1 - p_r) \qquad (1)$$

where $dm_{dps/dt}$=mass flow through intake manifold pressure gradient $K_1$ recalculation of mass flow to relative charge $K_2$ recalculation of intake manifold pressure to relative charge $p_s$=intake manifold pressure $F_1$=adjusting parameter "intake manifold pressure" (sensor offset error)

$p_r$=pressure of internal residual gas

The other physical relationship is based on a "throttle equation" and fits the following formula:

$$dm_2 = (dm_{wdk} + F_2) * K_3 * \left(K_4 + \frac{F_3}{1013}\right) * K_5\left(\frac{(p_s + F_1)}{(p_{vdk} + F_3)}\right) \qquad (2)$$

where $dm_{wdk}$=normal mass flow from throttle valve angle $F_2$=adjusting parameter "normal mass flow" (throttle valve leakage error)

$K_3$=temperature correction for normal mass flow $K_4$=pressure correction for normal mass flow $F_3$=adjusting parameter "pressure before throttle valve" (error environmental pressure sensor)

$K_5$=outflow characteristics curve
$p_s$=intake manifold pressure
$F_1$=adjusting parameter "intake manifold pressure" (sensor offset error)
$p_{vdk}$=pressure before throttle valve It should be understood that the two formulas should lead to the same result, so that the following applies $$dm=dm_1=dm_2. \quad (3)$$

In the example method of FIG. 2, one utilizes the facts of the case, that certain influence variables, namely intake manifold pressure $p_s$, pressure $p_{vdk}$ upstream of throttle valve 30 and normal mass flow $dm_{wdk}$, yielded by throttle valve angle wdk, have differently powerful influences, in different operating ranges of internal combustion engine 10, on mass flow $dm_1$. Therefore, errors in these influence variables are learned or monitored by solving the above equation (3) in a certain operating range for a certain influence variable. In order to be able to quantify the error more easily, adjusting parameters $F_1$, $F_2$ and $F_3$ are present in the above equations (1) and (2). Adjusting parameter $F_1$ is learned or monitored in an operating range $OP_1$ (cf. FIG. 3). Operating range $OP_1$ is defined by a minimum speed $nmot_2$ and a maximum intake manifold pressure $p_{s1}$. Adjusting parameter $F_2$ is learned or monitored in an operating range $OP_2$ which is limited by a maximum speed $nmot_1$ (which is smaller than $nmot_2$) and a curve that corresponds to a constant and comparatively small opening angle $wdk_1$ of throttle valve 30. Adjusting parameter $F_3$ is learned or monitored in an operating range $OP_3$ of internal combustion engine 10 which, on the one hand, is limited by a minimal intake manifold pressure $p_{s2}$ and a maximal intake manifold pressure $p_{s3}$ and, on the other hand, is limited by a limiting line which corresponds to a constant and comparatively large opening angle $wdk_2$ of throttle valve 30.

With reference to FIG. 2, in turn, all this means the following: After a start in 48, for instance, at a first start-up of internal combustion engine 10 or directly after a successful inspection, when one may assume an error-free operation of internal combustion engine 10, adjusting parameters $F_1$, $F_2$ and $F_3$ in 50 are set equal to zero. Then, one waits in 52 until internal combustion engine 10 is being operated in operating range $OP_1$. If this is the case, adjusting parameter $F_1$ is ascertained for the first time by solving the above equation (3). Adjusting parameter $F_1$ ascertained in this presumably error-free operating state of internal combustion engine 10 additionally bears the index 0.

Thereupon in 56 one waits until internal combustion engine is in operating range $OP_2$. If this is the case, then in a manner analogous to 54, adjusting parameter $F_2$ is ascertained in 58, which is also additionally provided with index 0, since it is ascertained in the presumably error-free operating state of internal combustion engine 10. In 60, waiting finally takes place until internal combustion engine 10 is in operating state $OP_3$, and in 62 adjusting parameter $F_{3\_0}$ is then ascertained. In 64, a counter n is incremented by 1, and in 66 it is compared to a boundary value $G_1$. If the counter is less than the boundary value, the system returns to before 52. It is ensured thereby that, in this presumably error-free operating state of internal combustion engine 10, adjusting parameters 1, $F_2$ and $F_3$ are learned several times, namely, each time taking into account the previously ascertained adjusting parameters. This improves the quality of the adjusting parameters ascertained. One may also recognize from FIG. 2 that the method ensures that adjusting parameters $F_1$, $F_2$ and $F_3$ are basically ascertained only alternatingly, which means that the same adjusting parameter is never learned twice directly in succession. Alternatively, one could also design the method in such a way that a reliability coefficient is only increased if an alternating learning of the adjusting parameters had taken place before.

If counter n exceeds limiting value $G_1$, one may assume that adjusting parameters $F_1$-$F_3$ have been learned with sufficient reliability for the presumably error-free operation of internal combustion engine 10. They are now stored in a memory and used for the now subsequent monitoring in normal operation. In this operation, analogously to 52, one again waits until internal combustion engine 10 is being operated in operating range $OP_1$. Then in 70, analogously to 54, adjusting parameter $F_1$ is ascertained by solving equation (3), and the difference is formed from adjusting parameter $F_{1\_0}$ that was learned in the presumably error-free state, and this difference is compared, in absolute value, to a boundary value $G_2$. If this absolute quantity is greater than boundary value $G_2$, this means that adjusting parameter "intake manifold pressure," and with that an offset of the signal of pressure sensor 42, has changed in an inadmissible way. In this case, therefore, in 72 an entry takes place in an error memory, and there takes place, for instance, a display on the dashboard of a motor vehicle, into which internal combustion engine 10 is installed, which points out to the driver an error function of pressure sensor 42.

Analogously to this, waiting takes place in 74 until internal combustion engine 10 is again in operating range $OP_2$. In 76 adjusting parameter $F_2$ is then ascertained, the difference from adjusting parameter $F_{2\_0}$, that was ascertained in the presumably error-free state, is formed, and the absolute value of the difference is compared to a boundary value $G_3$. If the absolute value of the difference exceeds boundary value $G_3$, this indicates an error at throttle valve 30, for instance, contamination or a leak. Therefore, in 78 an entry is made in a corresponding error memory and, analogously to the above, an indication that points to an error.

In 80, the system waits until the internal combustion engine is being operated in operating range $OP_3$. If this is the case, in 82, adjusting parameter $F_3$ is ascertained, the difference from adjusting parameter $F_{3\_0}$, ascertained in the presumably error-free operating state is formed, the absolute value of the difference is compared to a boundary value $G_4$, and in 84 and entry is made in an error memory if the absolute value of the difference exceeds boundary value $G_4$. The last is an indicator that the pressure $p_{vdk}$ prevailing upstream of throttle valve 30 is erroneous, which points to an error in environmental pressure sensor 46. For, pressure $p_{vdk}$ is ascertained via a model, from environmental pressure $p_u$, which is supplied by environmental pressure sensor 46. The method ends in 86.

In order to increase the reliability of the monitoring in blocks 68-84, it may also be provided that an entry in an error memory is only made if the determined inadmissible deviation of an adjusting parameter $F_1$-$F_3$ was established after a multiple and alternating run-through of method blocks 70, 76 and 82.

Figure 4:
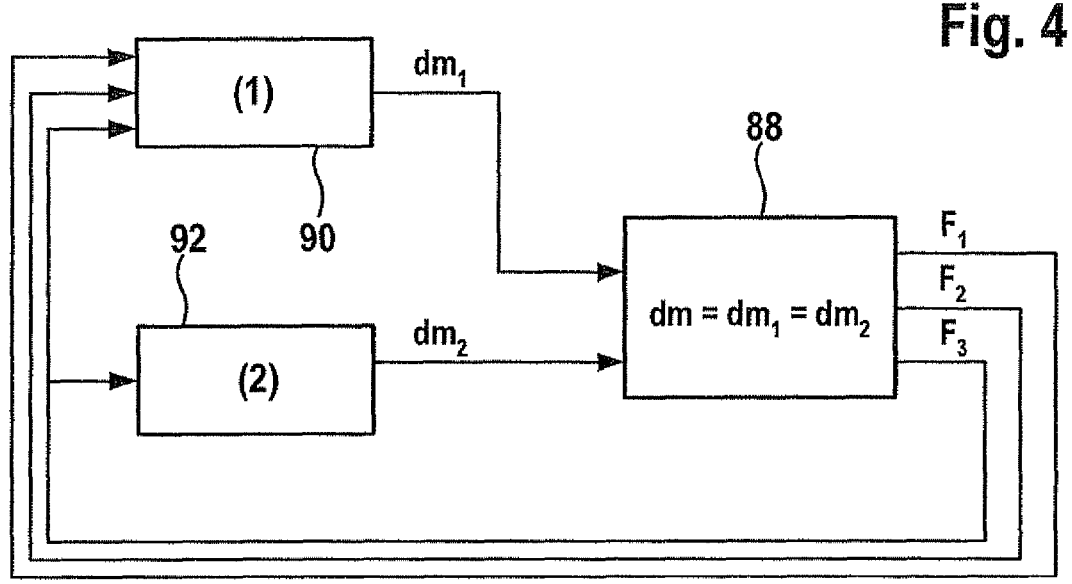
FIG. 4 shows a block diagram of the method of FIG. 2.

The example method is also shown in abbreviated form in FIG. 4: In 88, in the various operating ranges $OP_1$, $OP_2$ and $OP_3$, adjusting parameters $F_1$-$F_3$ are determined in such a way that the two equations (1) and (2) give the same result. In addition, an algorithm is stored in block 88 which gives information on the quality of the individual adjusting parameters $F_1$-$F_3$. This, for example, includes the condition that operating states $OP_1$-$OP_3$ have been reached several times and that adjusting parameters $F_1$-$F_3$ are no longer changing substantially. Equations (1) and (2) are solved in blocks 90 and 92, respectively.

What is claimed is:
1. A method for operating an internal combustion engine, in which at least one first influence variable influences a state variable of air in an intake manifold, wherein the state variable is a mass flow across a throttle valve, the method comprising:

ascertaining the state variable of the air in the intake manifold while taking into account a plurality of influence variables which influence the state variable of the air in the intake manifold, while using a first physical relationship between the state variable of the air and the influence variables;

ascertaining the state variable while taking into account a plurality of influence variables which influence the state variable of the air in the intake manifold, while using a second physical relationship between the state variable of the air and the influence variables;

linking to each of the influence variables a specific adjusting parameter which represents a degree of error in the respective influence variable;

monitoring the adjusting parameters during operation of the internal combustion engine; and monitoring a certain use of the adjusting parameters in an operating range of the internal combustion engine in which the other adjusting parameters have a lesser influence on the state variable than that the certain adjusting parameter, and in this context, the certain adjusting parameter being adjusted in such a way that the state variable ascertained while using the first physical relationship is at least approximately equal to the state variable ascertained while using the second physical relationship.

2. The method as recited in claim 1, wherein, among the plurality of influence variables, are at least one of: i) a pressure prevailing upstream of a throttle valve, ii) a mass flow ascertained from a throttle valve angle, iii) an intake manifold pressure, and iv) an environmental pressure, and wherein the method further comprises concluding from the corresponding adjusting parameter whether the influence variable is in error.

3. The method as recited in claim 2, wherein the intake manifold pressure and the environmental pressure are recorded by a sensor, and wherein the method further comprises concluding from the corresponding adjusting parameter whether there is an error in the sensor.

4. The method as recited in claim 1, wherein the mass flow is ascertained while using the first physical relationship according to the following formula:

$$dm_1 = dm_{dps/dt} + K_1 * K_2 * (p_s + F_1 - p_r)$$

where
$dm_{dps/dt}$=mass flow through an intake manifold pressure gradient,
$K_1$=recalculation of the mass flow to a relative charge,
$K_2$=recalculation of the intake manifold pressure to the relative charge,
$p_s$=intake manifold pressure,
$F_1$=adjusting parameter of intake manifold pressure, corresponding to sensor offset error,
$p_r$=pressure of the internal residual gas,
and while using the second physical relationship according to the following formula:

$$dm_2 = (dm_{wdk} + F_2) * K_3 * \left(K_4 + \frac{F_3}{1013}\right) * K_5\left(\frac{(p_s + F_1)}{(p_{vdk} + F_3)}\right)$$

where
$dm_{wdk}$=normal mass flow from the throttle valve angle $F_2$=adjusting parameter of normal mass flow, corresponding to throttle valve leakage error
$K_3$=temperature correction for the normal mass flow
$K_4$=pressure correction for the normal mass flow
$F_3$=adjusting parameter of pressure before throttle valve, corresponding to environmental pressure sensor error
$K_5$=outflow characteristics curve
$p_s$=intake manifold pressure
$F_1$=adjusting parameter of intake manifold pressure, corresponding to sensor offset error
$p_{vdk}$=pressure before the throttle valve.

5. The method as recited in claim 4, wherein the adjusting parameters of intake manifold pressure is monitored if the rotational speed exceeds a boundary value and the intake manifold pressure falls below a boundary value.

6. The method as recited in claim 4, wherein the adjusting parameter of normal mass flow is monitored if at least one of the rotational speed falls below a boundary value, and a throttle valve angle falls below a boundary value.

7. The method as recited in claim 6, wherein the adjusting parameter of pressure before throttle valve is monitored if the intake manifold pressure exceeds a boundary value and if a throttle valve angle exceeds a boundary value.

8. The method as recited in claim 7, wherein the adjusting parameter of normal mass flow and the adjusting parameter of pressure before throttle valve are not monitored if the intake manifold pressure is higher than a boundary value.

9. The method as recited in claim 1, wherein the adjusting parameters are adjusted alternatingly and several times.

10. The method as recited in claim 9, wherein a quality feature is formed for an adjusting parameter from at least one of the number of adjustments carried out and a trend of changes in the adjustments.

11. The method as recited in claim 1, wherein, for the monitoring, at least one of an absolute value of an adjusting parameter, and a difference between the value of an adjusting parameter ascertained during the monitoring and an adjusting parameter ascertained during monitoring is compared to at least one boundary value.

12. A non-transitory computer-readable memory device storing a computer program having program codes, when executed by a controller, causing the controller to perform a method for operating an internal combustion engine, in which at least one first influence variable influences a state variable of air in an intake manifold, wherein the state variable is a mass flow across a throttle valve, the method comprising:

ascertaining the state variable of air in the intake manifold of the internal combustion engine while taking into account a plurality of influence variables which influence the state variable of the air in the intake manifold, while using a first physical relationship between the state variable of the air and the influence variables;

ascertaining the state variable while taking into account a plurality of influence variables which influence the state variable of the air in the intake manifold, while using a second physical relationship between the state variable of the air and the influence variables;

linking to each of the influence variables a specific adjusting parameter which represents a degree of error in the respective influence variable;

monitoring the adjusting parameters during operation of the internal combustion engine; and monitoring a certain use of the adjusting parameters in an operating range of the internal combustion engine in which the other adjusting parameters have a lesser influence on the state variable than that the certain adjusting parameter, and in this context, the certain adjusting parameter being adjusted in such a way that the state variable ascertained while using the first physical relationship is at least approximately equal to the state variable ascertained while using the second physical relationship.

13. A non-transitory electrical storage medium for a control device of an internal combustion engine, the storage medium storing a computer program which, when executed by the control, causing the control to perform a method for operating the internal combustion engine, in which at least one first influence variable influences a state variable of air in an intake manifold, wherein the state variable is a mass flow across a throttle valve, the method comprising:
- ascertaining the state variable of air in the intake manifold of the internal combustion engine while taking into account a plurality of influence variables which influence the state variable of the air in the intake manifold, while using a first physical relationship between the state variable of the air and the influence variables;
- ascertaining the state variable while taking into account a plurality of influence variables which influence the state variable of the air in the intake manifold, while using a second physical relationship between the state variable of the air and the influence variables;
- linking to each of the influence variables a specific adjusting parameter which represents a degree of error in the respective influence variable;
- monitoring the adjusting parameters during operation of the internal combustion engine; and
- monitoring a certain use of the adjusting parameters in an operating range of the internal combustion engine in which the other adjusting parameters have a lesser influence on the state variable than that the certain adjusting parameter, and in this context, the certain adjusting parameter being adjusted in such a way that the state variable ascertained while using the first physical relationship is at least approximately equal to the state variable ascertained while using the second physical relationship.

14. A control device for an internal combustion engine, the control device adapted to perform a method for operating the internal combustion engine, in which at least one first influence variable influences a state variable of air in an intake manifold, wherein the state variable is a mass flow across a throttle valve, the method comprising:
- ascertaining the state variable of air in the intake manifold of the internal combustion engine while taking into account a plurality of influence variables which influence the state variable of the air in the intake manifold, while using a first physical relationship between the state variable of the air and the influence variables;
- ascertaining the state variable while taking into account a plurality of influence variables which influence the state variable of the air in the intake manifold, while using a second physical relationship between the state variable of the air and the influence variables;
- linking to each of the influence variables a specific adjusting parameter which represents a degree of error in the respective influence variable;
- monitoring the adjusting parameters during operation of the internal combustion engine; and
- monitoring a certain use of the adjusting parameters in an operating range of the internal combustion engine in which the other adjusting parameters have a lesser influence on the state variable than that the certain adjusting parameter, and in this context, the certain adjusting parameter being adjusted in such a way that the state variable ascertained while using the first physical relationship is at least approximately equal to the state variable ascertained while using the second physical relationship.

* * * * *